United States Patent
Hodam

(10) Patent No.: US 11,116,200 B1
(45) Date of Patent: Sep. 14, 2021

(54) ABATEMENT OF INSECT COLONIES

(71) Applicant: Robert H. Hodam, Elk Grove, CA (US)

(72) Inventor: Robert H. Hodam, Elk Grove, CA (US)

(*) Notice: Subject to any disclaimer, the term of this patent is extended or adjusted under 35 U.S.C. 154(b) by 0 days.

(21) Appl. No.: 16/875,206

(22) Filed: May 15, 2020

(51) Int. Cl.
*A01M 1/22* (2006.01)
*A01M 1/10* (2006.01)

(52) U.S. Cl.
CPC ............ *A01M 1/226* (2013.01); *A01M 1/103* (2013.01)

(58) Field of Classification Search
CPC ......... A01M 1/226; A01M 1/22; A01M 1/223
USPC ........................ 43/124, 132.1, 112; 116/22 A
See application file for complete search history.

(56) References Cited

U.S. PATENT DOCUMENTS

| | | | | |
|---|---|---|---|---|
| 2,223,813 A | * | 12/1940 | Brown ................... | A01M 1/226 422/22 |
| 4,163,966 A | * | 8/1979 | Mounce ................. | A01M 29/16 367/139 |
| 4,524,079 A | * | 6/1985 | Hofmann ................ | A23L 3/01 426/234 |
| 4,667,436 A | * | 5/1987 | Benson ................... | A01K 3/005 43/112 |
| 4,782,623 A | * | 11/1988 | Lawrence ............. | A01M 1/223 43/132.1 |
| 4,870,779 A | * | 10/1989 | Johnson ................. | A01M 29/24 43/124 |
| 5,060,414 A | * | 10/1991 | Wayland ............. | A01M 21/046 47/1.3 |
| H998 H | * | 12/1991 | Gerharz .......................... | 43/124 |
| 5,162,014 A | * | 11/1992 | Moore .................... | A01K 51/00 449/2 |
| 5,210,719 A | * | 5/1993 | Lawrence ............. | A01M 1/223 331/178 |
| 5,325,624 A | * | 7/1994 | Richardson ........... | A01M 1/223 43/112 |
| 5,339,564 A | * | 8/1994 | Wilson .................. | A01M 1/226 43/107 |
| 5,353,543 A | * | 10/1994 | Teraoka ................. | A01M 29/26 116/22 A |
| 5,442,876 A | * | 8/1995 | Pedersen ................ | A01M 1/226 43/124 |
| 5,449,889 A | * | 9/1995 | Samardzija ............. | A01M 1/06 166/248 |
| 5,501,032 A | * | 3/1996 | Pitman ................ | A01M 17/002 43/129 |
| 5,501,034 A | * | 3/1996 | Hazan ................... | A01M 1/103 43/132.1 |

(Continued)

FOREIGN PATENT DOCUMENTS

GB    2275594 A  *  9/1994  .......... A01M 21/046
JP    06153744 A  *  6/1994

*Primary Examiner* — Peter M Poon
*Assistant Examiner* — Morgan T Barlow
(74) *Attorney, Agent, or Firm* — GSS Law Group; Gregory S. Smith; Phillip Wagner

(57) ABSTRACT

A method for reducing a population size of a colony of magnetosensitive insects includes placing wire loop near a nest sheltering the colony, driving the wire loop with an electrical current sufficient to produce a transmitted magnetic field stronger than the earth's natural magnetic field, exposing eggs and pupae from the colony to the transmitted magnetic field, and maintaining exposure of the colony to the transmitted magnetic field until the population size of the colony decreases.

9 Claims, 1 Drawing Sheet

(56) References Cited

U.S. PATENT DOCUMENTS

| | | | | |
|---|---|---|---|---|
| 5,930,946 | A * | 8/1999 | Mah | A01M 29/18 43/124 |
| 5,968,401 | A * | 10/1999 | Roy | A01M 1/226 219/679 |
| 6,134,826 | A * | 10/2000 | Mah | A01M 1/04 43/112 |
| 6,202,343 | B1 * | 3/2001 | Mah | A01M 3/005 43/112 |
| 6,341,444 | B1 * | 1/2002 | Cina | A01G 13/10 43/112 |
| 6,401,637 | B1 * | 6/2002 | Haller | A01M 1/226 111/118 |
| 6,442,890 | B1 * | 9/2002 | Creeger | A01M 1/00 43/131 |
| 6,609,330 | B1 * | 8/2003 | Heitman | A01M 1/023 43/112 |
| 6,996,029 | B1 * | 2/2006 | Boyd | A01M 29/18 367/139 |
| 7,497,047 | B1 * | 3/2009 | Aesch, Jr. | A01M 1/026 43/132.1 |
| 2002/0101352 | A1 * | 8/2002 | Barber | A01M 1/24 340/573.2 |
| 2002/0180607 | A1 * | 12/2002 | Donskoy | G01N 33/46 340/573.2 |
| 2003/0001745 | A1 * | 1/2003 | Barber | A01M 1/026 340/573.2 |
| 2003/0014907 | A1 * | 1/2003 | Amburgey | A01M 1/2011 43/132.1 |
| 2003/0146840 | A1 * | 8/2003 | Donskoy | G01N 33/46 340/573.2 |
| 2003/0215354 | A1 * | 11/2003 | Clark | A01G 11/00 422/22 |
| 2004/0140900 | A1 * | 7/2004 | Barber | A01M 1/24 340/573.2 |
| 2005/0039379 | A1 * | 2/2005 | Pollinger | A01M 17/00 43/132.1 |
| 2006/0024195 | A1 * | 2/2006 | Lagunas-Solar | A01M 1/226 422/22 |
| 2006/0186115 | A1 * | 8/2006 | Joines | A01M 19/00 219/678 |
| 2007/0022652 | A1 * | 2/2007 | Moore | A01M 1/24 43/112 |
| 2007/0068067 | A1 * | 3/2007 | Ragon | A01M 29/28 43/132.1 |
| 2007/0107297 | A1 * | 5/2007 | Wijenberg | A01M 1/226 43/107 |
| 2007/0137096 | A1 * | 6/2007 | Ragon | A01M 1/02 43/132.1 |
| 2007/0283616 | A1 * | 12/2007 | Holmes | A01M 17/004 43/132.1 |
| 2010/0186285 | A1 * | 7/2010 | Schmitt | A01M 1/24 43/132.1 |
| 2012/0085020 | A1 * | 4/2012 | Cink | A01M 29/28 43/107 |
| 2015/0150237 | A1 * | 6/2015 | Valls | A01M 29/28 43/132.1 |
| 2017/0020122 | A1 * | 1/2017 | Mirzakhani Nafchi | A01M 21/046 |
| 2017/0094960 | A1 * | 4/2017 | Sasaki | A01N 37/02 |
| 2017/0181420 | A1 * | 6/2017 | Cohen | A01M 99/00 |
| 2017/0290318 | A1 * | 10/2017 | Bergengren | A01M 1/023 |
| 2017/0315804 | A1 * | 11/2017 | Frudakis | G08B 13/18 |
| 2018/0070556 | A1 * | 3/2018 | Hagen | A01K 3/005 |
| 2019/0116778 | A1 * | 4/2019 | Lavin | A01M 21/046 |
| 2019/0274296 | A1 * | 9/2019 | Schmidt | A01N 43/90 |
| 2020/0068866 | A1 * | 3/2020 | Taylor | H05B 6/36 |
| 2020/0107539 | A1 * | 4/2020 | Brodie | H01P 5/087 |

* cited by examiner

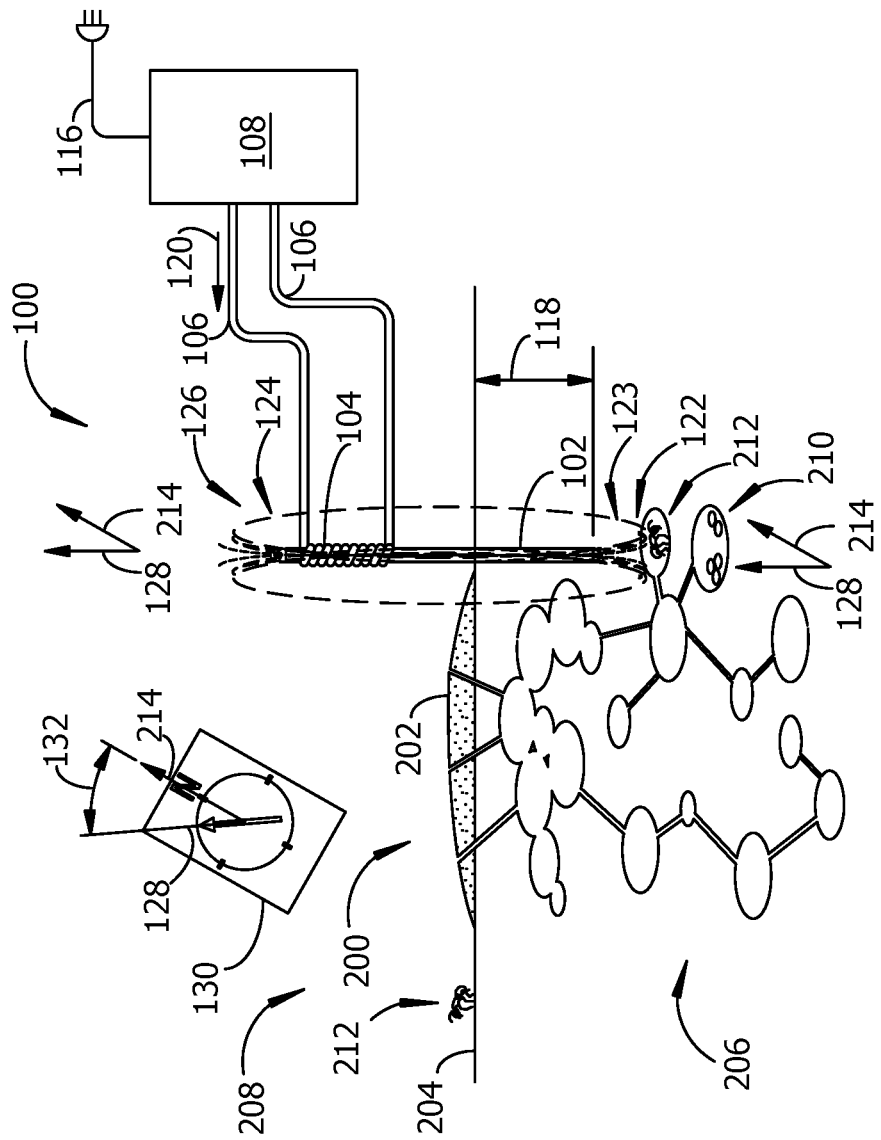

ABATEMENT OF INSECT COLONIES

FIELD OF THE INVENTION

Embodiments are related in general to the generation of electromagnetic fields for magnetizing materials, and more specifically to the use of electromagnetic fields to affect the navigational behavior of animals.

BACKGROUND

Ants are one of the most successful animal groups on earth, evolving from ancestral forms more than 100 million years ago into more than 20,000 species estimated to be alive at present. Ants are eusocial insect members of the order Hymenoptera, the order also including wasps and bees, and of the family Formicidae. Many species of Formicidae build nest structures sheltering colonies with large populations, with tens of thousands to hundreds of thousands of ants in one nest not unusual. Ant colonies include groups of specialized colony members adapted for specific activities or behaviors such as scouting, foraging, nest construction, nest maintenance, reproduction, attacking and raiding other colonies, colony defense, and other activities.

Some species have colony members equipped with stings or powerful mandibles capable of delivering painful and potentially injurious stings or bites. Some species of ants, for example red imported fire ants (RIFA), *Solenopsis invicta* Buren, react with swarming behavior to nest disturbances, possibly with hundreds or thousands of ants drawn to the source of a perceived disturbance such as a person or animal stepping on a nest. Such mass attacks are capable of inflicting lethal injuries to small or young animals, particularly animals that tend to remain motionless when concealed or threatened. RIFA, army ants, and other ant species have been known to fatally attack lambs, calves, chicks, and other small animals. Humans are also at risk, for example infants unable to escape an attack and people who have an allergic reaction to venom or acid injected by an insect sting or bite. An allergic reaction may be severe enough to be considered a medical emergency.

In addition to the risks of injury and death from ant bites or stings, excavations performed by the insects may damage or undermine buildings and other structures made from wood, mortar, plaster, or concrete. Ants may transport food, nest waste, construction debris, and even large numbers of dead colony members into walls, foundations, electrical transformers, pipelines, drainage systems, agricultural machinery, and other structures. RIFA and some other ant species are attracted to electrical fields and are a well-known source of maintenance problems for electrical power utilities. Large congregations of RIFA attracted to electrical equipment have caused short circuits in transformers, switchgear, motors, and other machinery.

Health, safety, and economic concerns have motivated extensive research into ant behavior and physiology. Some ant species have been found to possess magnetosensitivity, the ability to detect and respond to the strength and/or direction of a magnetic field. In some species, magnetosensitivity is associated with magnetically active particles located in or on an ant's body. The magnetically active particles may function like an "internal compass", enabling magnetosensitive ants to make successful round trips from their nest to resources outside the nest by making directional decisions based on sensory detection of the earth's magnetic field. Magnetosensitive ants may be able to complete successful foraging and scouting trips when visual, tactile, path integration, olfactory, and other navigational cues are unavailable or contradict one another.

In some species, magnetically active particles may form in an ant's body at an early stage of development, before emergence as an adult after pupation. In other species, an adult worker ant may collect magnetically active particles on a part of the body such as legs or antennae. The magnetic field direction, e.g., the north and south magnetic poles of the magnetically active particles, may align to the direction of the earth's magnetic field at the nest location by sympathetic magnetization or other processes by which the particles were formed and deposited. During a behavior referred to as a "learning walk", a magnetosensitive ant may calibrate its response to sensed interactions between the magnetically active particles carried by the ant and the earth's magnetic field, establishing a calibrated directional awareness supporting directional decisions relative to the earth's magnetic field.

Magnetosensitive ants are known to respond to electromagnetic fields other than the earth's natural magnetic field. Navigational decisions made by adult worker ants can be influenced by exposing the ants to an electromagnetic field transmitted from an antenna while the ants move about. More particularly, worker ants' directional decisions can be changed by an electromagnetic field strong enough to override the ants' detection of the earth's magnetic field. An ant's direction of travel while being exposed to an electromagnetic field may be influenced by shutting the field off, changing field strength, changing field direction, or changing the frequency of the electromagnetic radiation. Navigational responses to an electromagnetic field imposed on ants while they scout or forage may take precedence over other navigational processes, for example visual navigation by landmarks, navigation by scent markers placed by colony members, path integration ("counting steps"), and navigation by observing the direction to the sun or stars. Some species have been observed to prioritize navigational responses to electromagnetic fields even when such responses contradict navigational information from other senses.

Navigation errors may result from exposing ants to a generated electromagnetic field while the ants move about. An electromagnetic field deliberately produced by a non-natural source such as an apparatus including an electrical conductor carrying electrical current may be referred to as a generated electromagnetic field. An ant exposed to a generated electromagnetic field stronger than the earth's natural magnetic field while making navigation decisions may be unable to follow a previously-established path to a location of a needed resource or may be unable to return to the nest even when other navigational cues are available. Worker ants unable to return to the nest are unable to contribute to the resource needs of the colony and are likely to perish. These discoveries led to further research into the effects of exposing worker ants to electromagnetic fields while the ants are scouting or foraging, and selecting field parameters to modify ants' navigational accuracy and path choices.

Large ant colonies may survive with a sensitive balance between resources consumed by the colony and resources available within range of foraging workers. Removing foraging workers from a colony has been observed to reduce colony territory size. Territory size may rebound after removed workers have been replaced. Territory size has been shown to correlate to colony population. Large colonies may benefit from "economy of scale", where the resource demand per individual to sustain the nest decreases as colony population increases. A decrease in the number of successful foraging trips can trigger a drop in egg production from insufficient resources being provided to reproducing members of the colony. A downward spiral in population may occur when worker ants are not replaced in sufficient numbers to sustain the colony. The population may eventually fall below a threshold needed for continued survival of the colony, leading to colony collapse.

Poison baits, gases, liquids, and sprays have been used to kill established colonies and suppress the formation of new colonies. However, poisons may have undesirable collateral effects, including allergic reactions in humans and injury or death to farm animals, household pets, and wild animals that contact or ingest poison. Insecticides not intended for bees have been implicated in the collapse of bee colonies essential to agricultural success, for example. Poisons applied to the surface of an insect nest may kill foraging members from the colony but may fail to kill the reproducing members of the colony, allowing the colony to remain viable by replacing poisoned individuals. Poisons applied to the ground may be washed away by rain or irrigation systems or destroyed by exposure to sunlight, allowing new colonies to be established in the same area as a previously terminated colony. Poisons may be dispersed by the wind or may contaminate ground water serving as a source of drinking water. Poisons may trigger allergic or toxic reactions in persons or animals located a substantial distance, possibly many miles, from a site where poison has been applied to a nest.

BRIEF DESCRIPTION OF THE DRAWINGS

FIG. 1 shows a schematic diagram of an underground nest sheltering an ant colony, a block diagram of an example apparatus in accord with a method embodiment for reducing a population size of the ant colony, an example magnetic field imposed on the nest by the apparatus, and an example measurement of a direction of the magnetic field modifying the ants' magnetosensitive direction sense.

SUMMARY

An example embodiment of a method for reducing a population size of an insect colony includes placing a wire loop in close proximity to a nest sheltering the insect colony; passing an electrical current through the wire loop to generate a transmitted magnetic field with a field strength at the nest greater than a field strength of a natural magnetic field generated by the earth; and exposing a group of eggs and/or pupae from the nest to the transmitted magnetic field until a group of workers emerging from the nest exhibit a magnetosensitive directional sense relative to the transmitted magnetic field.

The example method may optionally include any one or more of the following, in any order: passing a direct current (DC) through the wire loop; generating the transmitted magnetic field with a north direction substantially different from a north direction of the earth's natural magnetic field; adjusting a ground penetration distance of the transmitted magnetic field; configuring the wire loop as an electromagnet; and driving the wire loop with the electrical current until the population of the insect colony collapses.

The example method may further optionally include any one or more of the following, in any order: estimating a development time for an egg in the insect colony to develop into an adult worker; exposing the group of eggs and/or pupae to the transmitted magnetic field for a time duration greater than the development time; turning off the transmitted magnetic field after the time duration has elapsed; generating the transmitted magnetic field with a north direction offset from a north direction of the earth's natural magnetic field; and generating the transmitted magnetic field as a magnetostatic field. The transmitted magnetic field may be magnetostatic for the entire time duration.

The example method may further optionally include any one or more of the following, in any order: turning off the transmitted magnetic field after the group of workers from the insect colony exhibit the magnetosensitive directional sense relative to the transmitted magnetic field; increasing a magnitude of the electric current until a direction measurement of the transmitted magnetic field indicates a difference in direction from geomagnetic north; maintaining transmission of the transmitted magnetic field until no workers remain with a magnetosensitive direction sense relative to the earth's natural magnetic field; and maintaining exposure of the nest to the transmitted magnetic field until workers emerging from the nest exhibit an inability to navigate to a food source by the earth's natural magnetic field when the transmitted field is temporarily turned off.

DESCRIPTION

Example embodiments of a method for reducing a population size of a colony of social insects include changing a direction of magnetization of magnetically-active particles carried in or on the bodies of foraging members of the colony. The change in direction of magnetization is preferably performed by exposing eggs, pupae, and/or juvenile colony members in the nest to a transmitted magnetostatic electromagnetic field having a field strength greater than the field strength of the earth's magnetic field and a field direction substantially different from the direction to geomagnetic north at the location of the colony's nest.

Colony members with a magnetosensitive directional sense adapted to the transmitted electromagnetic field generated during performance of the disclosed method embodiments will make a statistically significant number of incorrect navigational decisions when attempting to navigate to and from the nest with reference to the earth's magnetic field in the absence of the transmitted electromagnetic field. Incorrect navigational decisions may contribute to substantially longer duration foraging trips to find needed resources, foraging trips which cover substantially greater distances from the nest, a reduction in the number of successfully navigated trips to resource locations outside the nest, and a reduction in the number of successful returns to the nest with collected resources or information about resource locations. The disclosed methods are effective for impairing the colony's ability to procure sufficient resources for colony survival and/or defend the colony's territory, eventually leading to a reduction in population size of the colony.

The example method embodiments are effective for reducing the size of a colony without mechanically disturbing the nest and/or applying chemical agents to the nest or colony territory. The example method embodiments are further effective for reducing the population size of an insect colony without the use of baits, poisons, drowning or asphyxiating the insects, and/or heating or cooling the nest to a temperature outside a temperature range needed for successful reproduction and emergence of adult workers. Method embodiments may be performed without the method causing toxic and/or allergic reactions in humans and animals.

The transmitted electromagnetic field imposed on a colony to shift the reference direction for the ants' magnetic navigation sense away from geomagnetic north is not required to be present and/or detectable by worker ants outside the nest. After the ants' magnetic navigation sense has been modified by the disclosed method, the transmitted electromagnetic field used to establish the change in magnetization direction may be turned off. The distance over which the transmitted electromagnetic field is effective for changing the direction of magnetization of the magnetically active particles carried by the ants may be substantially less than the distance ants travel away from the nest while performing scouting or foraging activities. The field strength of the transmitted magnetostatic electromagnetic field outside the nest may be substantially less than a field strength needed to induce electrical shock or other physiological and/or perceptual disruptions in adult worker ants traveling away from the nest.

The magnetic field reference direction established by the transmitted electromagnetic field acting on the magnetically active particles carried by the ants will preferably be adjusted to differ from the direction to the earth's north magnetic pole for the natural magnetic field experienced by the ants as they forage. Ants with a modified directional sense resulting from exposure to the transmitted electromagnetic field will continue to make incorrect navigational decisions after the transmitted electromagnetic field has been turned off. Incorrect navigational decisions by the ants may reduce the probability of successful round trips to a statistically random outcome as the ants wander about unable to choose the correct direction to a resource or nest entrance being sought. Ants with the modified directional sense may be unable to overcome navigational errors while attempting to navigate by the direction of the earth's magnetic field even when other navigational cues are available.

The example method embodiments may expose magnetosensitive ants to a transmitted magnetostatic magnetic field while the ants are in relatively sedentary phases of their life cycle including embryo development in an egg, emergence of a larva from an egg, and pupation. The magnetostatic aspect of the transmitted electromagnetic field establishes a fixed and substantial difference in the magnetic field direction (e.g., "north" direction) for the magnetically active particles in the ant's bodies from the "north" field direction (e.g., direction to geomagnetic north) of the earth's natural-occurring magnetic field.

The example method embodiments differ substantially from previously-known methods for modifying animal navigation by exposing animals to an electromagnetic field while the animals are moving about and making navigational decisions. Previous methods appear to require the presence of an artificially-generated electromagnetic field during at least part of the duration of an animal's travels to successfully modify the animal's navigational decisions. Unlike the example method embodiments disclosed herein, removing a electromagnetic field used with previously known methods may enable a magnetosensitive animal to recover an accurate sense of direction and perform accurate navigation relative to the earth's magnetic field. Further unlike the disclosed example embodiments, previously known methods may expose magnetosensitive animals to magnetic fields which are not magnetostatic, that is, the fields may have time-varying frequency, amplitude, and/or magnetic field direction.

The disclosed method embodiments are effective for abatement of some colonies of insects from the order Hymenoptera. The disclosed method embodiments are further effective for abatement of colonies formed by insects of the family Formicidae. As used herein, abatement of an insect colony refers to impairing the ability of the colony to survive, possibly by interfering with the ability of foraging members of the colony to return sufficient nutrient materials to nest inhabitants such as the queen, newly-hatched insects, and colony members dependent on transported water and processed food materials for survival. Abatement may also refer to disrupting colony activities sufficiently to cause the colony members to relocate the nest to a new location away from an area protected by equipment used with a method embodiment. Abatement may further refer to preventing a new colony from establishing itself in an area protected by equipment used by a method embodiment. Abatement may be pursued until a colony collapses or relocates. Colony collapse may refer to a reduction in colony population to a number of colony members insufficient to sustain colony survival. Colony collapse may also refer to a colony which has lost the ability to care for juvenile colony members and/or replace dead or injured workers.

FIG. 1 illustrates some aspects of an example method embodiment for abatement of an insect colony. The example method embodiment 100 includes exposing members of an ant colony 208 including unhatched eggs, larvae, and pupae 210 and workers 212 inside the chambers and passageways in the nest structure to a magnetostatic magnetic field having a field strength greater than the earth's natural magnetic field and a field direction shifted away from geomagnetic north. Geomagnetic north refers to a direction to the north magnetic pole of the earth's natural magnetic field.

As used herein, an example of a worker 212 includes colony members adapted for scouting and/or foraging outside the nest. Although a worker affected by operation of the disclosed method embodiment may spend part of its adult life performing activities inside the nest, when the worker performs activities outside the nest its navigational choices may be incorrect and the worker may fail to return to the nest. The example method embodiment 100 modifies the worker's magnetosensitive directional reference so that attempts to navigate outside the nest by determining directions relative to the earth's natural magnetic field result in incorrect navigational choices.

The illustrated example of a nest 200 includes a mound 202 above the ground surface 204. The mound 202 may indicate the location of one or more entrances into below-surface chambers and passageways 206 sheltering the insect colony 208. For some colony insects, for example some species of fire ants, the chambers and passageways 206 may extend over distances of many feet and may include many chambers of varying sizes and more than one mound 202. The chambers and passageways may have been built with features that obstruct the flow of water entering the nest. Some ant species seal off sections of the nest when a threat to the colony is detected. Such nest features and insect behaviors may limit the ability of gaseous and liquid agents entering the nest to cause the colony 208 to collapse or move.

The transmitted magnetostatic magnetic field 122, represented in FIG. 1 by example magnetic field lines 123 coupled to an example antenna 124, may be generated by coupling a conducted electric current 120 from a current source 108 to a wire loop 104. The wire loop may be formed into a cylindrical or circular shape by one or more turns of an insulated electrical wire 106. Alternatively, the wire loop may be wound around a toroidal core. In the example of FIG. 1, the antenna 124 is arranged as an example electromagnet 126 including the wire loop 104 surrounding a rod or stake 102 incorporating a ferromagnetic material.

The example current source 108 is preferably configured to support generation of a magnetostatic magnetic field by outputting on electrical wire 106 an electric current 120 that is substantially a direct current (DC). Examples of a current source 108 include, but are not limited to, a DC electric storage battery, an alternating current (AC) to DC power converter, a DC to DC power converter, and a photovoltaic (PV) panel and PV panel controller with a DC output. The attribute of a magnetostatic field of benefit to the disclosed method 100 is the constant direction of the magnitude of the vector field representing field strength. Electrical power input to the current source 108 is optionally supplied from an electrical connection 116 to an AC power source.

The example current source 108 is optionally configured to selectively output on electrical wire 106 an electrical current 120 that includes any one or more of a DC current with an AC component less than 1% of the DC amplitude, an AC current with a DC component less than 1% of the AC amplitude, and an electrical current 120 with substantial AC and DC components. Transmission of an AC signal may optionally be followed by transmission of a DC signal, and vice versa.

The example method embodiment 100 may begin by placing the antenna 124 near a nest sheltering an insect colony, then driving the antenna 124 with a conducted electrical current 120 passing through the electrical wires 106 to the antenna coil 104. The conducted electrical current 120 flows into the antenna and generates the transmitted magnetostatic magnetic field 122. The transmitted magnetic field 122 may impinge on insects on the surface 204 and in the chambers and passageways 206 of the nest 200. Shutting off the conducted electrical current 120 ends generation of the transmitted magnetic field 122.

The example method 100 includes generating the transmitted magnetic field 122 with a "north" direction reference 128 offset from the north direction reference 214 of the earth's natural magnetic field. The offset north direction 128 of the transmitted magnetic field 122 may re-magnetize magnetic particles carried in the ants' bodies or may alternatively cause the magnetic particles to form in eggs or larvae with the offset north direction 128. A magnitude of difference in direction 132 between the direction to the north magnetic pole 128 of the transmitted magnetic field 122, used by the ants as a reference direction for magnetosensitive direction finding after sufficient exposure to the transmitted magnetic field, and the direction to geomagnetic north 214, may be selected by adjusting the current 120 driving the wire loop 104 until the selected change in direction of magnetization is measured. The magnitude of difference in direction 132 of the magnetostatic field 122 may be estimated by observing the effect of the transmitted magnetic field 122 on a magnetic compass 130, by a gaussmeter, or with other instruments for measurement of magnetic fields.

The antenna 124 may be placed with the antenna stake 102 in close proximity to the insect nest 200. The antenna 124 may further be placed with the antenna stake driven into the ground or other structure surrounding the nest 200 a selected penetration depth 118, for example to increase a field strength in nest chambers and passageways 206 where eggs, larvae, and/or pupae 210 may be located. Any one or more of the penetration depth 118, the offset direction 128 to the magnetic north pole associated with the transmitted magnetic field 122, a field strength of the transmitted magnetic field 122, and the location of the antenna 124 relative to the mound 202 may be adjusted to maximize abatement of the insect nest 200. When used in or near a man-made structure such as a building, machine, wall, culvert, and so on, the antenna may be placed on a surface of a part of the structure or in a cavity within the structure, without the antenna or antenna stake penetrating part of the structure.

The transmitted magnetic field 122 will preferably be generated to induce a north direction 128 that is substantially different than the north direction 214 of the earth's magnetic field. Transmission of the magnetic field 122 may continue until the population of the nest 200 collapses. A minimum duration of time for transmission of the magnetic field 122 may be estimated by identifying the species of insect in the colony 208, estimating a development time duration for an egg 210 in the insect colony to develop into an adult worker 212, and exposing a group of the eggs, larvae, and/or pupae in the nest to the transmitted magnetic field for a time duration greater than the development time. After the group of the eggs, larvae, and/or pupae in the nest have been exposed to the transmitted field continuously and without interruption for at least the duration of the development time, the transmitted magnetic field may be turned off to observe the ants outside the nest for navigational errors including an inability to return to the nest. For example, for some fire ant species the uninterrupted exposure time needed to interfere with the foraging behavior of an entire generation of ants is 24-hour-a day exposure for at least one month. When operated to alter the ants' navigational abilities, the transmitted magnetic field 122 preferably remains magnetostatic for the entire duration of the transmission. The transmitted magnetic field may optionally be transmitted for several multiples of the development time to cause sequential generations of workers to navigate incorrectly, until the colony collapses.

The transmitted magnetic field 122 may optionally be turned off after a group of workers are observed to exhibit a magnetosensitive direction sense relative to the transmitted magnetic field rather than relative to geomagnetic north. For example, workers may be observed to be unable to navigate successfully to and from a test food source placed a selected distance from the mound, perhaps returning to the food source and/or nest with a frequency consistent with random navigational choices.

The transmitted magnetic field may optionally be generated with a substantial time-varying component. Ants have been observed to be attracted to electrical conductors radiating electrical and magnetic fields generated by AC currents. The AC magnetic field may directly interfere with the ant's navigational abilities or may cause the ants to remain in the vicinity of the wire loop 104. Ants that have been attracted to the rod 102, wire loop 104, and/or electrical wires 106 may fail to leave the vicinity of the apparatus 100 to forage for food and other resources needed by the colony to survive.

Successful abatement of the insect nest may be determined by any one or more of the following examples, in any order: observing a reduction in a number of insects leaving the nest; observing one or more members of the colony leaving the nest and failing to return to the nest, possibly indicating that the insects are unable to navigate effectively; observing that the nest is eroding without being repaired; and observing that damage to the mound or other parts of the nest are not being repaired. Successful abatement of the insect nest may further be determined by any one or more of the following examples, in any order: observing that foraging insects from the colony are not found near the nest; observing the colony relocating to a new nest location; observing eggs and juvenile insects being carried out of the nest; and observing that no insects leave the nest following a disturbance to the nest.

After abatement succeeds in causing a colony to collapse or relocate, the example method embodiment may continue to be practiced to suppress insect activities directed at establishing a new nest. The example method embodiment may be practiced to prevent a nest from being established in an area that has not previously had a nest.

Unless expressly stated otherwise herein, ordinary terms have their corresponding ordinary meanings within the respective contexts of their presentations, and ordinary terms of art have their corresponding regular meanings.

What is claimed is:

1. A method for reducing a population size of an insect colony, comprising:
   forming a wire loop around a stake incorporating a ferromagnetic material;
   positioning the stake near a nest for an ant colony;
   generating a magnetostatic magnetic field in the wire loop and the stake by passing an electrical current from a current source through the wire loop;
   transmitting the magnetostatic magnetic field into the nest with a field strength in the nest greater than a field strength of a natural magnetic field of the earth at the nest, for a time duration greater than a development time for an egg in the colony to develop into a worker ant; and
   turning off the magnetostatic magnetic field after the time duration,
   wherein a field strength outside the nest is less than a field strength to induce an electrical shock, a physiological disruption, and/or a perceptual disruption in an ant outside the nest.

2. The method of claim 1, further comprising passing a direct current (DC) through the wire loop.

3. The method of claim 1, further comprising generating the magnetostatic magnetic field with a north direction different from a north direction of the earth's natural magnetic field.

4. The method of claim 1, further comprising adjusting a ground penetration distance of the magnetostatic magnetic field.

5. The method of claim 1, further comprising driving the wire loop with the electrical current until the population of the insect colony collapses.

6. The method of claim 1, further comprising transmitting the magnetostatic magnetic field is continuously without interruption for at least the development time.

7. The method of claim 1, further comprising increasing a magnitude of an electric current to the wire loop until a direction measurement of the magnetostatic magnetic field indicates a difference in direction from geomagnetic north.

8. The method of claim 1, further comprising transmitting the magnetostatic magnetic field until no worker ants remain with a magnetosensitive direction sense relative to the earth's natural magnetic field.

9. The method of claim 1, further comprising maintaining exposure of the nest to the magnetostatic magnetic field until worker ants emerging from the nest exhibit an inability to navigate to a food source by the earth's natural magnetic field when the magnetostatic magnetic field is turned off.

* * * * *